United States Patent [19]

Crider et al.

[11] Patent Number: 5,336,131

[45] Date of Patent: Aug. 9, 1994

[54] DIFFERENTIAL PRESSURE CONTROL APPARATUS FOR LIVESTOCK HOUSES

[75] Inventors: Grant W. Crider, Bremen; Anthony L. Ellard, Cullman, both of Ala.

[73] Assignee: Hired Hand Manufacturing, Inc., Bremen, Ala.

[21] Appl. No.: 741

[22] Filed: Jan. 5, 1993

[51] Int. Cl.⁵ .............................................. B64D 13/00
[52] U.S. Cl. .................................... 454/238; 454/255; 236/49.3
[58] Field of Search ................. 236/49.3; 454/70, 255, 454/238; 119/16

[56] References Cited

U.S. PATENT DOCUMENTS 4,043,256  8/1977  Van Huis .................... 454/255 X
4,986,469  1/1991  Sutton, Jr. .................... 236/49.3

FOREIGN PATENT DOCUMENTS 0590557  1/1978  U.S.S.R. .................... 236/49.3

*Primary Examiner*—William E. Wayner
*Attorney, Agent, or Firm*—Veal & Associates

[57] ABSTRACT

A method for ventilating an animal enclosure using a plurality of closable ventilation openings. Sensors measure ambient outside temperature and ambient atmospheric pressure. A controller correlates said measurements for temperature, and pressure to determine a differential pressure between the interior of said enclosure and atmospheric pressure. Air is then transported by said fans to draw said air in a predetermined volume to achieve said determined differential pressure.

15 Claims, 4 Drawing Sheets

DIFFERENTIAL PRESSURE CONTROL APPARATUS FOR LIVESTOCK HOUSES

FIELD OF THE INVENTION

The present invention relates to livestock or poultry buildings. More particularly the invention relates to the ventilation and cooling of these buildings with the introduction of moving air. In even greater particularity the present invention relates to the controlled movement of air through livestock and poultry buildings based on a differential pressure inside these buildings and outside ambient atmospheric pressure.

BACKGROUND OF THE INVENTION

The importance of temperature control and adequate ventilation has long been known in the field of livestock and poultry buildings. Animals raised in these buildings require a constant supply of fresh air for growth and development. As the number of animals confined increases or their relative size increases, additional air must be introduced into these confinement buildings.

The close proximity of animals in a confinement building generates large amounts of fecal waste material and heat. Although these confinement buildings are often equipped with a means for the easy removal of waste material, a constant supply of moving air is necessary for animal health. The spread of communicable diseases common in confinement operations and can lead to devastating losses to the poultry or livestock producer. A constant supply of fresh, quality air inhibits the generation and spread of such diseases.

An efficient conversion of feedstuff into marketable protein and fat products is of paramount importance to a poultry and livestock producer. Unreliable air quality can result in animals with physiological stress from expending metabolic energy for respiration and controlling core body temperature. These animals tend to gain weight at a lower rate than animals raised in less stressful environments. An animal's production of eggs and milk will also decrease in response to elevated stress. Slower rates of gain and lower production increase the costs to the producer thus lowering his profits.

In a given confinement building, a certain amount of air must be replaced. This is done in order to remove moisture, by-products of respiration, and dust and to bring in a sufficient amount of fresh air. However, it is important that the air be brought in in a way as to protect the livestock. Cold air is normally dryer and contains more oxygen per cubic foot than warm air. In fact, for every 20 degrees Fahrenheit, air expands two to one. Therefore, less cold air is required than warm air to accommodate the livestock in a confinement building. Keeping that in mind, it is also necessary to prevent incoming cold air from just dumping onto the livestock in a building. This is done by increasing the velocity of the air as it enters the building. Air entering a building near the ceiling at 600 fpm will shoot over 20 feet in a building. If cold air is brought in at this sort of velocity, it is well mixed and warmed by the surrounding air before it reaches the livestock. However, in warm weather the opposite is true. It is necessary to bring in a larger volume (to bring in the same amount of oxygen and moisture carrying capability) of air to accomplish the necessary ventilation. Furthermore, because this air is warm, it is acceptable to bring it in at a low velocity and allow it to fall directly onto the livestock. Two methods exist with variable speed fans and the other is to have set speed fans with movable vent openings. The latter is what is most commonly used in livestock and poultry buildings because, with a static pressure monitor such as the Power Vent, control is position, that is, the system reacts to a direct measurement.

Livestock and poultry buildings must be well ventilated out of health concerns for the producer and or his/her employees. Without adequate ventilation, these buildings can be inundated with ammonia and excessive humidity. These gases are capable of entering a person's respiratory system and causing complications after prolonged exposure. Many confinement operations require the use of a mask to prevent the inhalation of these gases. A growing, nationwide concern for the safety of farm laborers makes improved ventilating techniques of vital importance.

Methods commonly used to bring air into confinement buildings include motorized baffles or vent doors. These baffles and doors can be opened at varying degrees to compensate for the number of exhaust fans running at any given time to force air out of a building. Mechanical controllers, such as the Hired-Hand Vent Controller, are used to open and close vent doors or raise and lower curtains via power drive units as needed.

The current systems for controlling air flow into a confinement building have relied only on an acceptable differential static pressure to open and close vents or curtains. These systems were not capable of changing the velocity of air entering the building with the change in the outside temperature. Often extremely cold air would be forced in directly over livestock before the ambient temperature inside the building was altered enough for a controller to halt the flow of air. These immediate sharp temperature gradients can cause the onset of sickness or death including pneumonia in some livestock. Present confinement ventilating systems are thus inadequate for controlling the velocity of air, contact of air with livestock and mixing of air upon entry into a confinement building.

SUMMARY OF THE INVENTION

It is the object of this invention to provide a method of ventilating an animal enclosure by delivering air into the building at a velocity calculated from a measurement of the differential pressure between inside the building and outside atmospheric pressure as well as outside ambient temperature.

Yet another object of this invention is to minimize steep temperature gradients when adjusting the control of air flow into animal confinement buildings.

These and other objects of the present invention are accomplished by altering the air pressure inside an animal confinement building based on a calculated target differential pressure derived from outside ambient temperature. Sensors measure ambient outside temperature while a transducer measures the differential between the static pressure inside the building and outside atmospheric pressure. These sensors and transducers are electrically connected to a controlling unit. The controlling unit consists of a microcontroller having programmable memory, random access memory and integrated logic circuits. Signals from the controller cause vent doors to open and close while exhaust fans are activated for moving air through the confinement building. The controller is programmable to target differential pressure in relation to outside pressure for inside the building based on the ambient outside temperature.

The operator enters a high-end temperature value and pressure value as well as a low-end temperature value and pressure value. The controller is constantly monitoring the outside ambient temperature and calculating a target differential pressure inside the building for measured temperatures between the high and low values. Motorized baffles and vents are opened or closed via electrical signals from the controller. The static pressure is equal to that of the computed target pressure for the inside of the confinement building.

DESCRIPTION OF A PREFERRED EMBODIMENT

Figure 1:
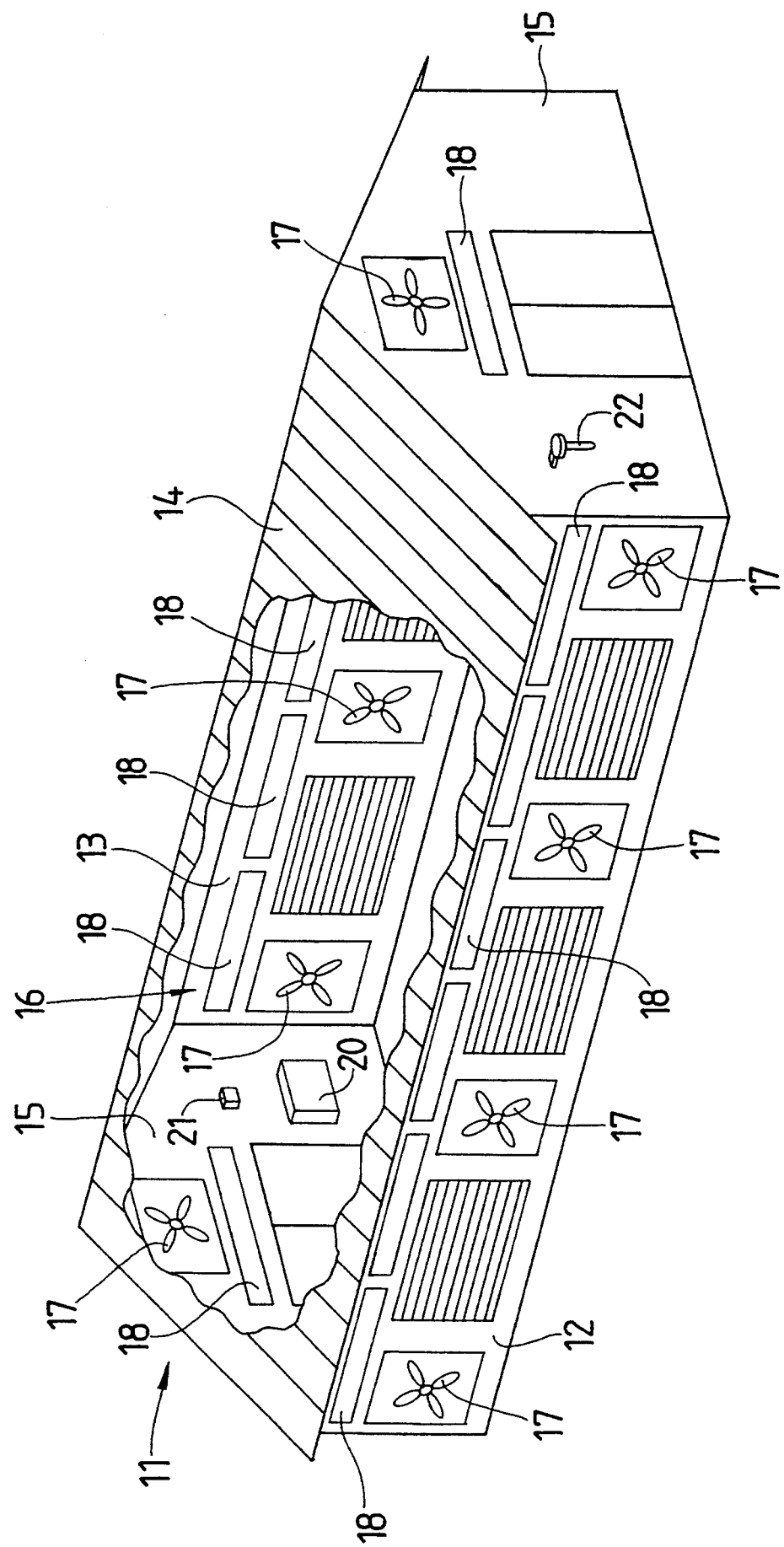
FIG. 1 is a perspective view with cutaway of an animal enclosure equipped with the present invention.

Referring to the drawings for a clearer understanding of the invention, it should be noted that FIG. 1 shows an animal enclosure 11. The enclosure 11 is formed from two opposing sidewalls 12 and 13 supporting an overhead roof 14. Endwalls 15 complete the enclosure 11 creating an interior 16 for confining poultry or livestock.

The opposing sidewalls 12 and 13 have a plurality of exhaust fans 17 mounted therein. These exhaust fans 17 are capable of moving air from interior 16 of enclosure 11.

Figure 2:
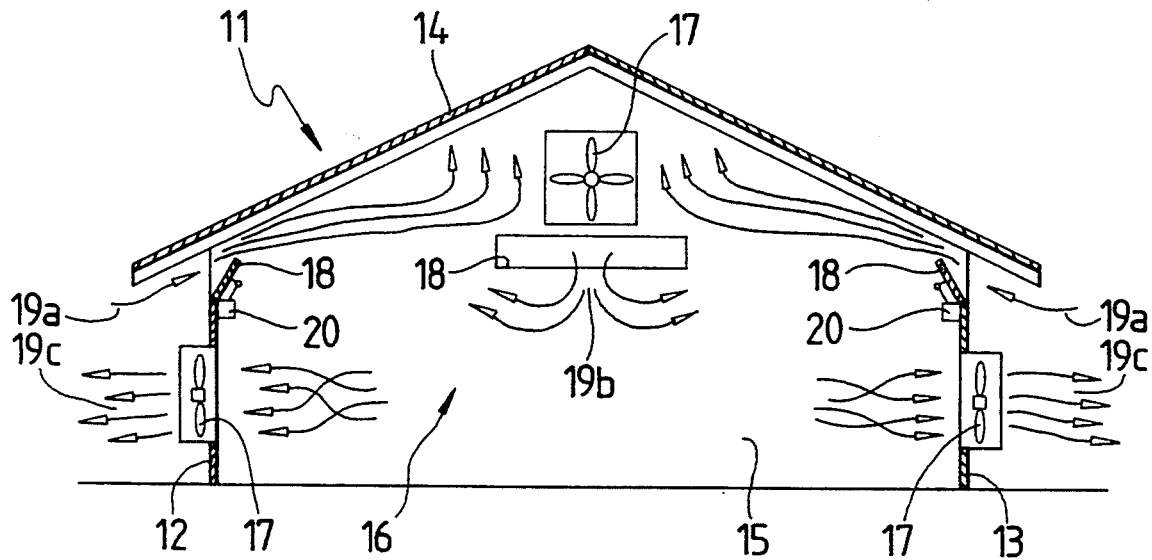
FIG. 2 is a cross sectional view of an animal enclosure equipped with the present invention in operation when outside ambient temperature is low.
Figure 3:
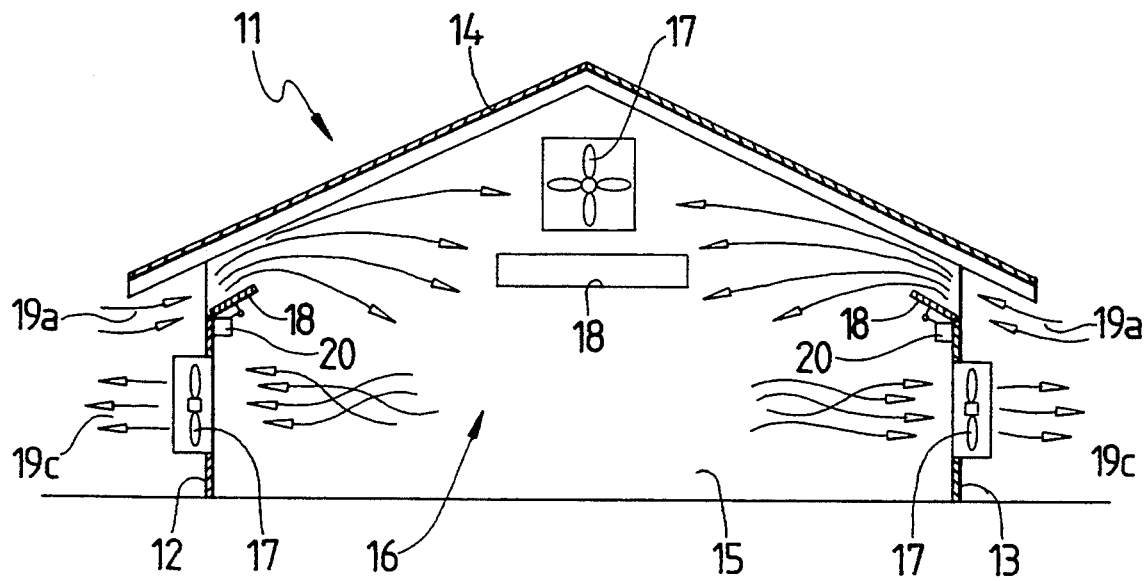
FIG. 3 is a cross sectional view of an animal enclosure equipped with the present invention in operation when outside ambient temperature is high.

Also located on the opposing sidewalls 12 and 13 are closable ventilating openings 18. These closable openings 18 may be motorized baffles or vent doors which are opened and closed by actuator 20 as shown in FIGS. 2 and 3.

The closable ventilating openings 18 can be opened and closed at varying degrees to compensate for the number of exhaust fans 17 in operation at any given time. The current methods of ventilating animal enclosures 11 use mechanical controllers to open and close openings as a function of temperature changes inside an enclosure 11.

Figure 5:
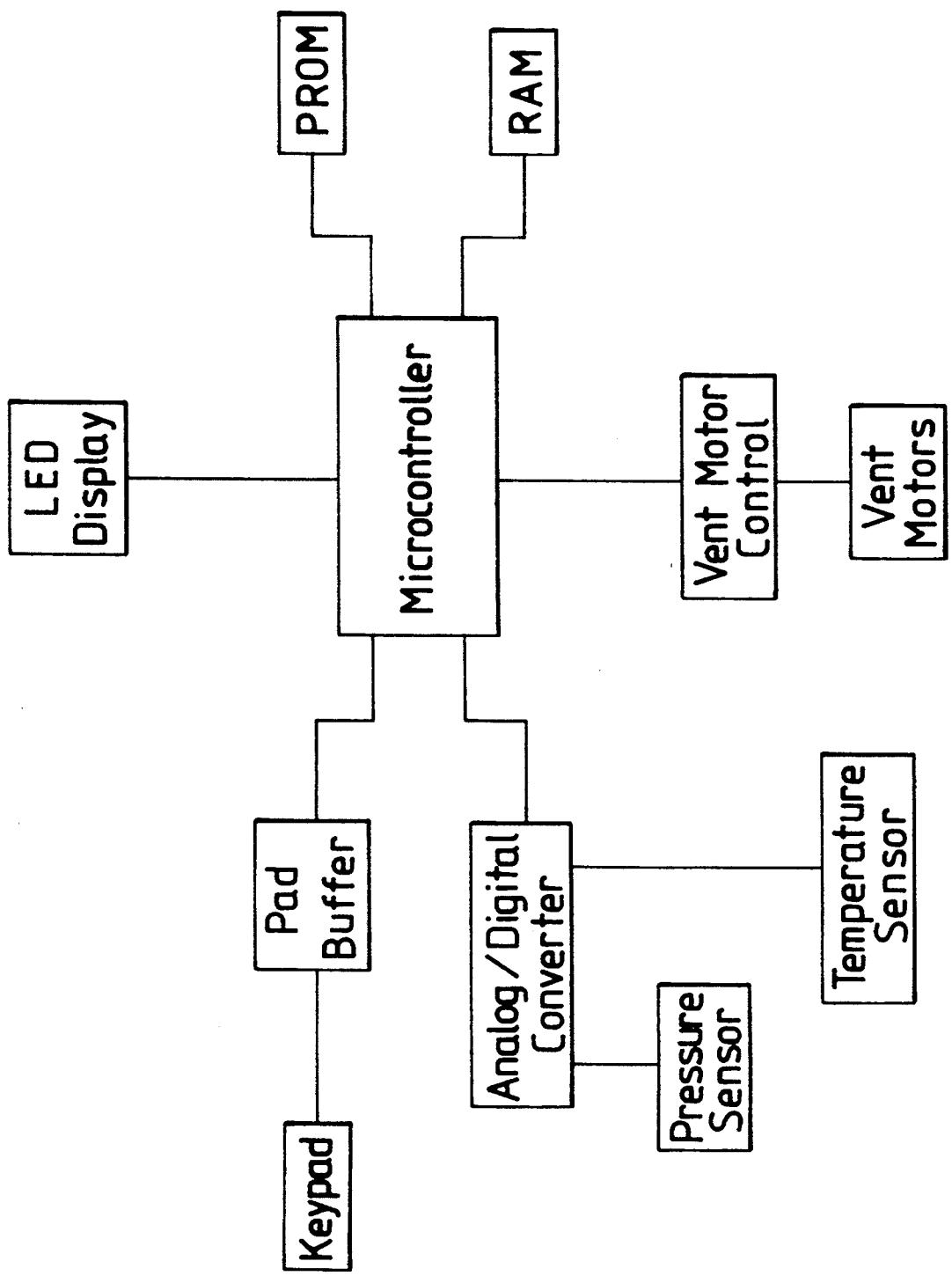
FIG. 5 is a block diagram of the controller.

The method of ventilating an animal enclosure in the present invention uses a controller 20 shown by a block diagram in FIG. 5 and familiar to those skilled in the art to vary the static pressure in the interior 16 of animal enclosure 11 thereby varying the differential pressure. This microcontroller (within controller 20) has 64k bytes of EPROM (erasable programmable memory), 2k bytes of nonvolatile static RAM (random access memory) and includes several integrated circuits of CMOS (complementary metal oxide semiconductor) logic.

A Modus Instruments T10 pressure transducer 21 with a range of 0–0.2" water column and an analog voltage output of 0–5 VDC (linear) is used to measure and relay differential pressure to the microcontroller (within controller 20). Outside ambient temperature is sensed using a standard NTC thermistor 22. The controller 20 sends signals to open and close the closable ventilating openings 18 to match a target differential pressure programmed into the microcontroller (within controller 20). The goal of the present invention is to control velocity of air 19a entering the enclosure 11. This, in turn, dictates how incoming air 19a mixes with air 19b within interior 16 of an enclosure 11. The temperature of air coming in direct contact with livestock or poultry confined in the building can be closely controlled in the present invention.

When altering the pressure differential in an enclosure 11, it is important to do so as a function of outside temperature. Examples of the various means to alter the pressure differential within the interior 16 of enclosure 11 are shown in FIGS. 2 and 3. In FIG. 2 the target temperature inside enclosure 11 may be 88 degrees F. while the outside ambient temperature is 30 degrees F. The desired method of ventilation in this situation is to have a high differential pressure. Thus, air 19a entering enclosure 11 through ventilator openings 18 at a high velocity, jets across the interior 16 and mixes with warm air 19b already within enclosure 11. Air 19b will be warmed before coming in direct contact with the livestock or poultry.

In FIG. 3, presume a target temperature of 88 degrees F. and an outside ambient temperature of 90 degrees F. In this example, air 19a enters the building as exhaust fans 17 remove air 19c. Since the incoming air 19a is as warm as the air 19b in interior 16 of enclosure 11, it is advantageous to bring as much air 19a as possible into enclosure 11. A low velocity and concurrent low differential pressure are desired for incoming air 19a.

A microcontroller (within controller 20) can automatically compute a desired differential pressure as a function of outside temperature. The outside temperature is relayed to the controller 20 from a standard NTC thermistor 22.

Figure 4:
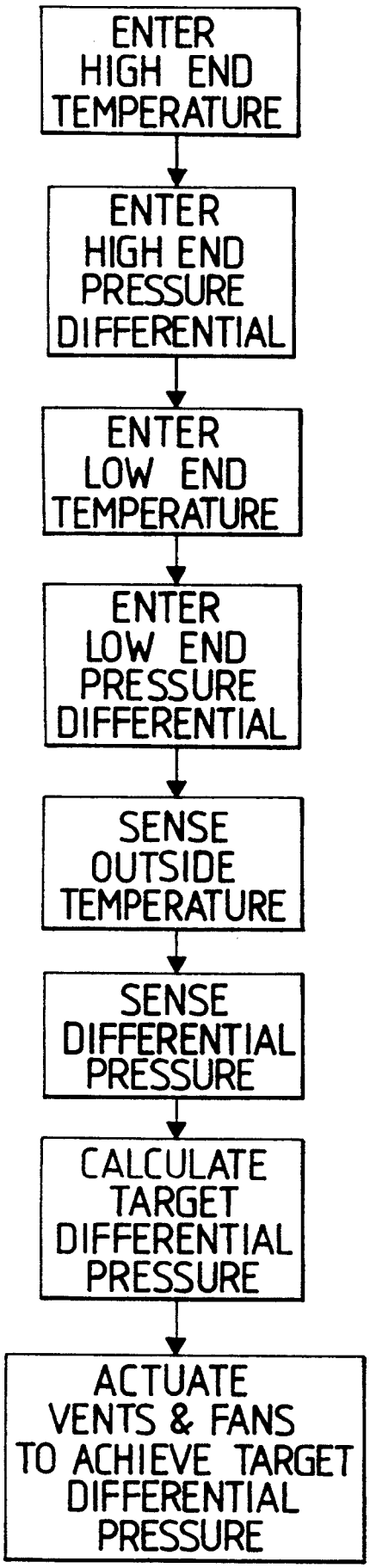
FIG. 4 is a flow chart of programming steps for the controller.

The operator is prompted by the microcontroller (within controller 20) as indicated in the flowchart of FIG. 4 to enter a high-end temperature value for the high-side of a differential pressure ramp. An example value would be 75 degrees F. Next, the operator is prompted to enter a high-end differential pressure value for the high side of the differential pressure ramp. The number here would be low, for example, 0.03" water column. A third prompt would ask for the entry of a low-end temperature value. This low point of the differential pressure ramp could, for example, be 25 degrees F. The last and final prompt is for operator to enter a low-end differential pressure value. This is the differential pressure to be set at the low-end temperature. An example of this value would be 0.10" water column. This value is entered into the programmable memory of the microcontroller (within controller 20).

The ventilation system will have a target differential pressure of 0.03" water column at a temperature of 75 degrees F. or higher. If the temperature is below 25 degrees F., the target differential pressure is set at 0.10" water column. When temperature values fall between the high and low-end values, the logic circuits compute a target differential pressure. If the temperature of air 19 entering the enclosure 11 is degrees F., (halfway between 75 and 25) the target differential pressure would be computed at 0.065" water column.

The controller 20 sends signals via electrical connections to open and close ventilator openings 18 drawing air 19a into interior 16 of enclosure 11 until the target differential pressure is achieved.

While I have shown invention in one form, it will be obvious to those skilled in the art that it is not so limited but is susceptible of various changes and modifications without departing from the spirit thereof.

We claim:

1. Apparatus for ventilating an animal enclosure for controlling air quality within said enclosure:
   (a) a plurality of fans and closable ventilation openings located along opposing walls of said enclosure;
   (b) means for sensing outside ambient temperature;
   (c) means for sensing differential pressure between interior and exterior of said enclosure;
   (d) means for using said outside ambient temperature to determine a target differential pressure between said interior of said enclosure and said outside of said enclosure; and
   (e) means for actuating said ventilation openings to create said target differential pressure to control the velocity of incoming air.

2. Apparatus as defined in claim 1 wherein said plurality of closable ventilation openings are motorized baffles and vent doors which can be opened at varying degrees.

3. Apparatus as defined in claim 1 wherein said means for sensing ambient outside temperature is a thermistor.

4. Apparatus as defined in claim 1 wherein said means for sensing differential pressure between said interior and said exterior of said enclosure is a pressure transducer.

5. Apparatus as defined in claim 1 wherein said means for actuating is a microcontroller including programmable memory cooperating with read only memory and integrated logic circuits, said microcontroller electrically connected to control actuating said closable ventilation openings.

6. Apparatus as defined in claim 5 wherein said microcontroller has a means for inputting high-end temperature and differential pressure values, as well as low-end temperature and differential pressure values, said microcontroller and cooperative logic computing a target differential pressure value for outside ambient temperature between said high and low-end temperature values.

7. Apparatus as defined in claim 6 wherein said microcontroller activates closable ventilation openings to adjust interior of said enclosure to said target differential pressure value.

8. Apparatus as defined in claim 1 wherein said closable ventilation openings are located near the top of said opposing walls forming sidewalls of said enclosure.

9. Apparatus as defined in claim 1 wherein said closable ventilation openings are located near the top of said opposing walls forming end walls of said enclosure.

10. Apparatus as defined in claim 1 wherein said plurality of fans are located in said opposing walls forming said enclosures.

11. Apparatus as defined in claim 1 wherein said plurality of fans are located in said opposing walls forming ends of said enclosure.

12. An improved method of ventilating an animal enclosure for controlling air quality within said enclosure, said improved method comprising the steps of:
    (a) providing said enclosure with a plurality of openings with motorized vent doors located along opposing walls of said enclosure;
    (b) sensing outside ambient temperature;
    (c) sensing differential pressure between an interior of said enclosure and an exterior of said enclosure;
    (d) using said outside ambient temperature to determine a target differential pressure between said interior of said enclosure and said exterior with a microcontroller electrically connected to actuate said motorized vent doors and activate said fans; and
    (e) forcing air through said enclosure with said fans and said motorized vent doors in sufficient volume to maximize movement of said air and achieve a targeted differential pressure within said enclosure.

13. An improved method of ventilating as defined in claim 12 wherein said using step includes programming a programmable memory and integrated logic circuits in said microcontroller.

14. An improved method of ventilating as defined in claim 13 wherein said using step includes entry into said programmable memory of a high-end temperature value, a low-end differential pressure value, a low-end temperature value and a high-end differential pressure value, said microcontroller being programmed to compute a target differential pressure value for outside ambient temperature between the said high and low values.

15. An improved method for ventilation as defined in claim 14 wherein said microcontroller activates said motorized vent doors to move a volume of said air for a time sufficient to adjust the interior of said enclosure to said target differential pressure value.

* * * * *